United States Patent
Russo et al.

(10) Patent No.: US 8,140,740 B2
(45) Date of Patent: Mar. 20, 2012

(54) DATA DEFRAGMENTATION OF SOLID-STATE MEMORY

(75) Inventors: Leonard Russo, Tomball, TX (US); James Kenneth Yates, Houston, TX (US); Walter Gaspard, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 390 days.

(21) Appl. No.: 12/608,902

(22) Filed: Oct. 29, 2009

(65) Prior Publication Data

US 2011/0107011 A1    May 5, 2011

(51) Int. Cl.
*G06F 13/00* (2006.01)
(52) U.S. Cl. .......................... 711/103; 710/18
(58) Field of Classification Search .................. 711/103; 710/18
See application file for complete search history.

(56) References Cited

U.S. PATENT DOCUMENTS

| 5,740,395 A * | 4/1998 | Wells et al. ................ 711/103 |
| 7,624,221 B1 * | 11/2009 | Case ............................ 710/310 |
| 8,032,724 B1 * | 10/2011 | Smith ........................... 711/159 |
| 2007/0186032 A1 * | 8/2007 | Sinclair et al. ............... 711/103 |

* cited by examiner

Primary Examiner — Jared Rutz

(57) ABSTRACT

A method and apparatus for improving the performance of a computer system having a solid-state (flash) memory device as the main system memory. After weeks or months of frequent use, solid-state memories can become badly fragmented, and although every memory cell has basically the same access time to retrieve or to write data from or into that cell, vendors have found that self-defragging utilities within the memory device often improves overall performance. Yet if such defragging utilities are automatically run when other applications are running simultaneously, the drain on system performance can be very detrimental. To avoid the occurrence of unwanted self-defragging of these solid-state memory devices, we inhibit under some circumstances such functionality until it is deemed safe to do so.

6 Claims, 3 Drawing Sheets

DATA DEFRAGMENTATION OF SOLID-STATE MEMORY

BACKGROUND OF THE INVENTION

The present invention relates generally to solid state drives ("SSD's) for computers, and more particularly, to optimizing solid-state drives for improved device performance in pc's, notebooks, net books, and even servers.

Since personal computers first came on the scene, users discovered that their data (and files) often got stored in widely diverse regions or clusters on the associated hard-disk drives. The more reading, writing, and deleting of data that took place, the slower the computing speeds became. The reason, of course, was that the spinning read/write heads had to access data from many different regions or tracks of the disk, and a loss of system performance was inevitable. Whereas if the data files were stored in a contiguous region of the disk, writing or retrieving of data took place much more quickly. Eventually manufacturers began installing defragmentation software utilities to repack and store the data in compact contiguous regions in generally the same physical location or tracks on the disk. Other file storage optimization techniques were used to reduce files from being fragmented. Defragging (as it was called) returned the system performance to nearly the speed and efficiency that had originally been expected. And being part of the system utilities, it became a frequently used tool to clean up the stored files. Usually this was done at night or during periods when the system was inactive, since defragging required significant system resources.

With the popularity of net books and small laptop computers, SSDs have become a very popular drive replacing the spinning hard-disk drive albeit at this time much more expensive. And with nothing spinning or with no heads scanning media, the access times should be the same whether the data is stored in one compact location or spread through numerous physical blocks. Therefore, defragmentation was initially though to be a thing of the past. Many knowledgeable commentators even cautioned users against ever turning on a defragging utility for SSDs. Since solid-state hard drives (SSHD) or flash memory have limited write cycles, defragging was thought to be detrimental to the drives. After some number of write cycles, albeit very large, it was believed that the devices would fail. Indeed just having a windows-based machine turned on would cause unnecessary wear to the SSDs. The only consideration was thought to be wear leveling, i.e., evenly spreading the number of write cycles throughout the SSD flash memory. Consequently some SSD vendors installed wear-leveling algorithms to minimize this problem. But, the initial consensus was that defragmenting would do more harm than good.

However, much to the surprise of many, after a few months of frequent use, net book users found that their initial happiness with the speed of their machines turned to dismay when computing times turned into a crawl. Benchmarking of the drives confirmed that the initial read/write speeds were significantly reduced. Further frustration occurred when users discovered that defragging system utilities sometimes made their problems worse, since the SSD devices had there own controllers that ran remapping algorithms of the drives as the controllers saw fit. And management of the memory controllers was done internally.

While the following discussion focuses primarily on an economical long lasting solution to minimizing some of the problems associated with slowing SSD device performance, the invention has utility for many other types of applications and devices where SSD memory is employed.

Further limitations and disadvantages of conventional and traditional approaches will become apparent to one skilled in the art, through comparison of such devices with a representative embodiment of the present invention as set forth in the remainder of the present application with reference to the drawings.

BRIEF DESCRIPTION OF THE DRAWINGS

For a better understanding of the invention as well as further features thereof, reference is made to the following description which is to be read in conjunction with the accompanying drawings wherein.

DETAILED DESCRIPTION

Figure 1:
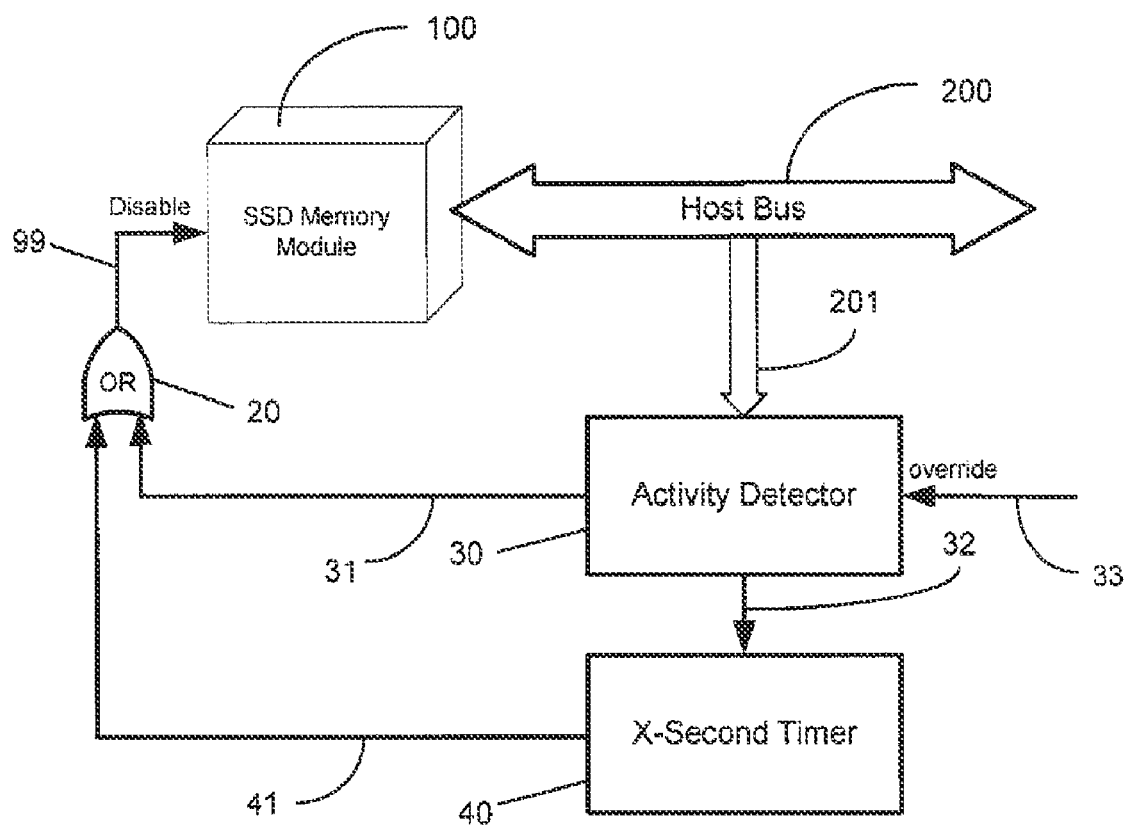
FIG. 1 is a block diagram schematically showing an example of a hardware implementation of the present invention.

Reference will now be made in detail to a representative embodiment of the present invention shown in the accompanying drawings, wherein like reference numerals refer to like elements throughout. Furthermore, in the following detailed description, numerous specific details are set forth in order to provide a thorough understanding of the present invention. However, it will be obvious to one of ordinary skill in the art that the present invention can be practiced without these specific details FIG. 1 is a block diagram schematically showing an example of a hardware implementation of the present invention where the SSD Memory Module 100 is the main memory module for use within a personal computer or like device. The memory module 100 communicates with the central processor and other parts of the pc (not depicted in FIG. 1) via the host bus 200. Activity detector 30 is bridged onto the bus via connection 201. Built into detector 30 is a activity threshold, which optionally may be either preset or made adjustable by the system user. Detector 30 has an optional override input 33 which connects to the host. Detector 30 has two outputs 31 and 32 with 31 connected to a simple OR gate 20 and 32 connected to a timer circuit 40. Timer circuit 40 is also connected to OR gate 20 via connection 41. The output of OR gate 20 connects to a disable input to memory module 100. The function of the disable input is merely to temporarily inactivate the defragging functionality within memory module 100. It applies a stop command to the controller within the memory module.

Figure 2:
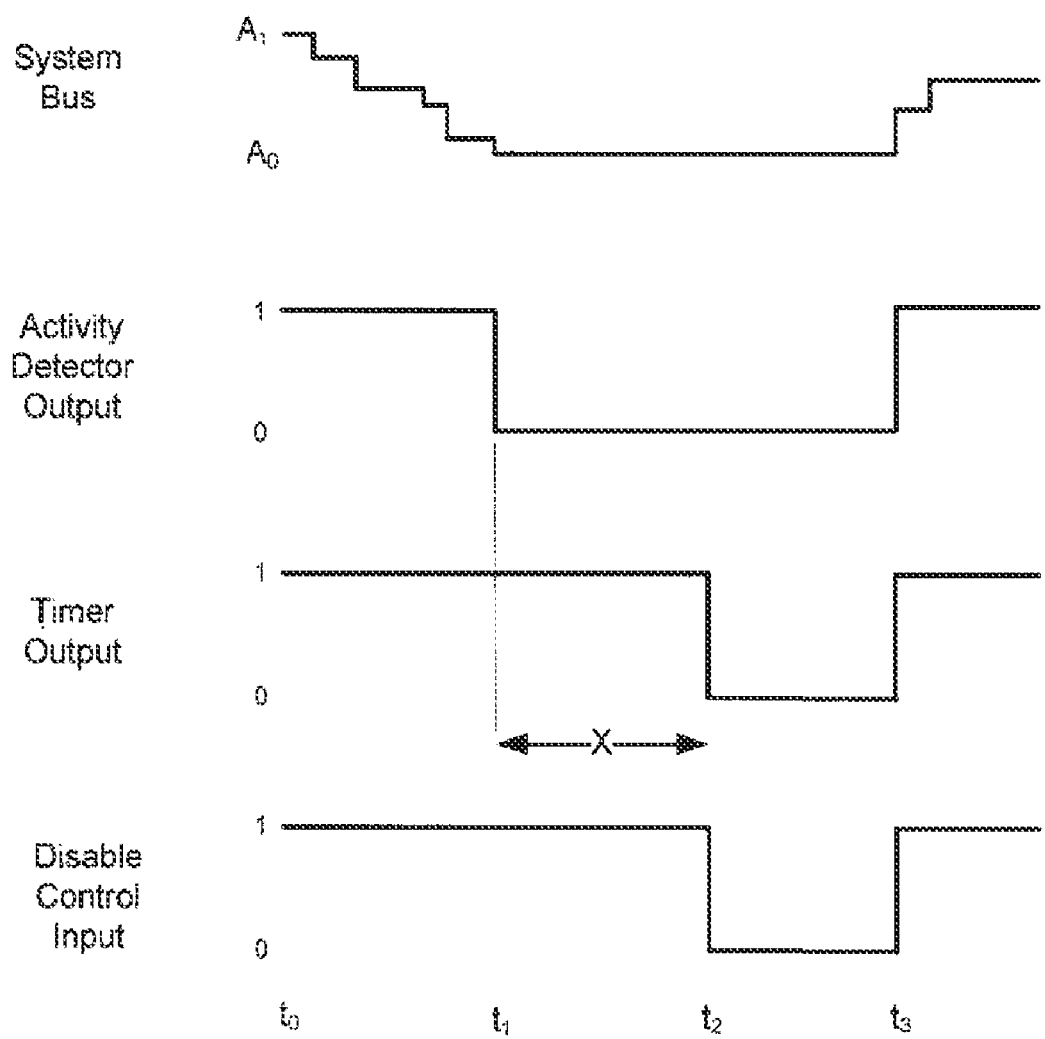
FIG. 2 is a timing diagram for use in illustrating the operation of the apparatus shown in FIG. 1.

Referring to FIG. 2, the timing diagram depicted shows the system bus 200 activity as seen by input 201, the output of detector 30 on paths 31 and 32, the output of X-second timer 40 on path 41, and the output of OR gate 20 on path 99. More particularly at time $t_0$ the host bus 200 shows an activity level of $A_1$ which corresponds to a relatively high level of system activity, i.e., the system is in use performing various tasks. Also at $t_0$ the output of activity detector 30 is a 1 corresponding to an active system bus, and timer circuit 40 also outputs a 1 so that both inputs to OR gate 20 are a 1. A 1 on either input will cause the disable control input to the SSD memory module 100 to be a 1 causing the internal controller to disable the defragging functionality. Clearly the objective here is to override the internal defragging activity while the host bus and CPU requires data from and to the system memory (SSD module 100). As the system activity drops to some predetermined threshold of $A_0$ at time $t_1$, activity detector 30 senses the changes and switches its output low (0) on both paths 31 and 32. However, the X-second timer 40 stays at a high (1) for a period of time of X seconds. Normally on the typical net book, we would set this period of time to be between 10 to 15 seconds to insure that some other process does not start up in the interim. In the example depicted in FIG. 2 there is nothing else that calls for system resources to access memory module 100, so that at time $t_2$ the output of timer circuit 40 switches from a 1 to a 0. This permits the output of OR gate 20 to similarly switch from a 1 to a 0, since both inputs are 0, lifting the disable control 99 to memory module 100. So that if a defragging had been taking place at some time preceding $t_0$, the internal controller could return to defragging the data in the SSD 100. Then at time $t_3$ when the host bus becomes active enough to exceed the predetermined threshold $A_0$, activity detector 30 and timer circuit 40 both switch back to a 1 causing OR gate 20 to switch high to again disable, the SSD 100 defragging functionality.

What we have discovered is that if system resources require writing and reading of data to and from the system memory, if a defragging command is initiated during any point in that process, the system will slow to levels that the typical user will find unaccept-able. And as more and more data is stored in memory, the internal fragmentation within SSD 100 increases. Unfortunately the internal SSD module controller assesses the need to defragment the data stored in memory based on parameters other than whether the computer is processing data for other critical or noncritical functions. To prevent such house cleaning activities within the SSD device 100 itself, we disable this process only until we can be assured that only some minimum level of memory use is needed, i.e., the bus activity to and from the memory is below a predetermined level. Therefore we wait for a number of seconds (X), preferably between a few seconds but less than a minute, before lifting the disable defragging function on the SSD 100 itself. Thus it is the host system CPU that determines whether defragging should take place, and not the internal SSD device controller. And input 33 to activity detector 30 may override the functionality of detector 30 by causing its outputs (31 and 32) to stay low (0) to allow the host to decide if it wants to trigger a separate device defragging of SSD 100 independent of the level of traffic on the host bus 200. Note that there are normally two separate defragging utilities within the typical system; one is within the SSD device itself and the other is the host defragging utility that is either installed by the OS vendor or a separate defragging application installed by the user.

Figure 3:
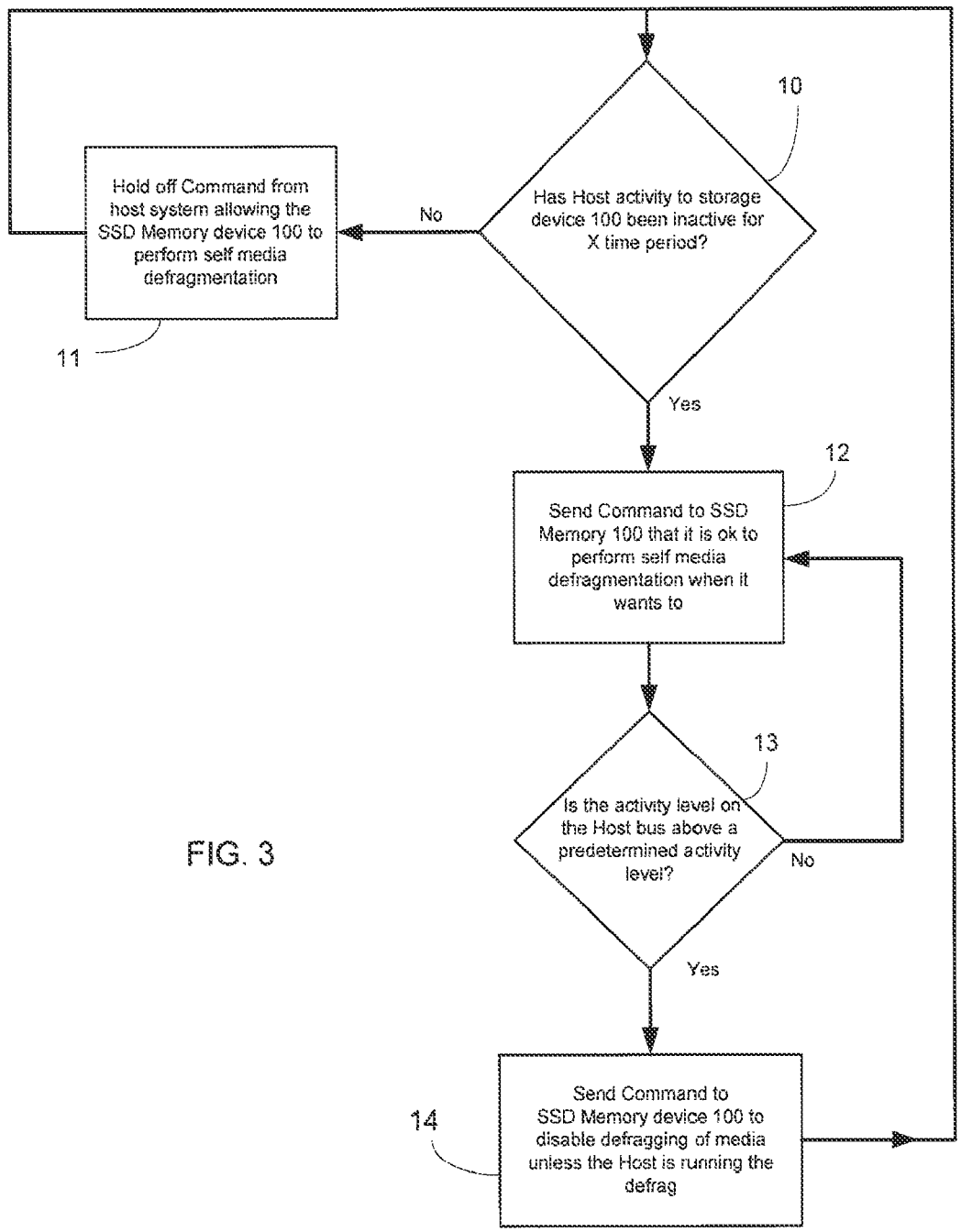
FIG. 3 is a flowchart schematically showing a process for implementing the preferred embodiment of the present invention.

Although FIG. 1 depicts how this process could be implemented in hardware, since we are operating within a computer software and hardware environment, the preferred embodiment of the present invention is implemented primarily in software as is shown by the process depicted in FIG. 3. At the initial step 10 we determine whether the host activity as seen on the system bus (200) to and from the SSD memory has been relatively inactive for some X period of time. If not (if there is activity on the system bus), at step 11 the system holds off sending what would be an "all clear" signal to allow defragging of system memory 100 if needed. (Note in virtually all operating computer systems, there is always some level of bus traffic, albeit at times very low. So we have selected a particular level of bus traffic above which defragging of the memory would be detrimental to normal operation of the host computer. Obviously this activity level would vary depending upon the make and set up of the computer.) But if the host has been inactive, as we have defined it, for some period of time X, it sends a command at step 12 to SSD memory 100 that the device controller may run a defrag of the memory if needed. At step 13 the system continues to monitor bus activity to and from SSD memory 100 and allows the defragmentation to continue until the activity threshold is exceeded. If such activity is detected, the host at step 14 sends a command to SSD memory module 100 to disable the defragging, unless it is the Host itself that is running the defragging process.

Another advantage of this arrangement is that the system user controls when a defrag takes place and not necessarily the SSD memory device itself.

While aspects of the present invention have been described with reference to certain embodiments, it will be understood by those skilled in the art that various changes may be made and equivalents may be substituted without departing from the scope of the representative embodiments of the present invention. For example although apparatus 100 has been characterized for use in a pc or net book environment, but the same technique would work for any electronic apparatus having a solid state memory, such as a server or other consumer electronic devices having a separate defragging utility built into the SSD module (cell phone or mp3 players). In addition, many modifications may be made to adapt a particular situation to the teachings of a representative embodiment of the present invention without departing from its scope. Therefore, it is intended that embodiments of the present invention not be limited to the particular embodiments disclosed herein, but that representative embodiments of the present invention include all embodiments falling within the scope of the appended claims.

What is claimed is:

1. Apparatus for inhibiting an SSD Memory from running a data defragging utility within the SSD Memory until the host computer processor permits it to take place, said apparatus comprising:
    an activity detector for monitoring whether the signal activity on the host system bus is above a predetermined threshold, and for generating a first disable output signal if the system bus signal activity is above the predetermined threshold and a first enable output signal if the host bus signal activity is below the predetermined threshold;
    a timer circuit receiving the output signals from the activity detector and generating a second disable signal upon receiving the first disable signal and generating a second enable output signal a predetermined time period after receiving the first enable output signal;
    a gating circuit for disabling defragmentation of the SSD Memory unless the gating circuit receives both the first and second enable output signals.

2. Apparatus as in claim 1, wherein the activity detector further comprises:
    an override signal input connected to the host computer processor for driving the activity detector outputs to generate first enable signals thereby enabling the defragmentation of the SSD Memory to take place.

3. Apparatus as in claim 2 wherein the gating circuit further comprises an OR gate.

4. Apparatus as in claim 3 wherein the predetermined time period is greater than 4 seconds.

5. In a computer system having an SSD Memory connected to a system host bus, a method of optimizing the computer performance by preventing defragmentation of the SSD Memory under certain predetermined conditions, said method comprising:
    monitoring the activity on the system bus and generating a disable command when the activity on the system bus is above a first predetermined activity level and generating an enable command when the activity on the system bus is below a second predetermined activity level for at least X period of time, where 4 seconds<X<60 seconds;
    providing the enable command to the SSD Memory to enable defragging of the SSD Memory only so long as the activity on the system bus stays below the second predetermined activity level;
    providing the disable command to the SSD Memory to prevent defragging of the SSD Memory so long as the system bus is above the first predetermined activity level, unless a defragging command is generated by the host system controller.

6. The method of claim 5 wherein the first and second predetermined activity levels are the same activity level.

* * * * *